(12) United States Patent
Kuciemba, Jr.

(10) Patent No.: US 10,492,503 B1
(45) Date of Patent: Dec. 3, 2019

(54) ADAPTOR FOR FACILITATING THE MANUFACTURE OF SAUSAGE

(71) Applicant: Brenda Kuciemba, New York, NY (US)

(72) Inventor: Louis Pete Kuciemba, Jr., Bremond, TX (US)

( * ) Notice: Subject to any disclaimer, the term of this patent is extended or adjusted under 35 U.S.C. 154(b) by 0 days.

(21) Appl. No.: 16/204,878

(22) Filed: Nov. 29, 2018

(51) Int. Cl.
*A22C 11/00* (2006.01)
*A22C 11/02* (2006.01)
*A23L 13/60* (2016.01)

(52) U.S. Cl.
CPC .......... *A22C 11/0218* (2013.01); *A23L 13/65* (2016.08); *A23V 2002/00* (2013.01)

(58) Field of Classification Search
CPC ..... A22C 11/00; A22C 11/001; A22C 11/008; A22C 11/02; A22C 11/0209
USPC ........................ 452/30–32, 35–37, 45–48, 51
See application file for complete search history.

(56) References Cited

U.S. PATENT DOCUMENTS

| | | | | |
|---|---|---|---|---|
| 2,168,693 A * | 8/1939 | Walter | .................... | A22C 11/10 452/45 |
| 3,306,754 A * | 2/1967 | Kielsmeier | ........ | A22C 13/0006 426/279 |
| 3,404,430 A * | 10/1968 | Kielsmeier | ........ | A22C 11/0209 426/413 |
| 3,733,653 A * | 5/1973 | Javaloy | .................. | A22C 11/02 452/36 |
| 3,739,427 A * | 6/1973 | Niedecker | .............. | A22C 11/02 452/35 |
| 3,883,925 A * | 5/1975 | Muller | .................... | A22C 11/02 452/41 |
| 4,023,238 A * | 5/1977 | Phares | .................... | A22C 11/02 452/37 |
| 4,321,728 A * | 3/1982 | Marz | ....................... | A22C 11/02 138/118.1 |
| 4,991,260 A * | 2/1991 | Nausedas | ........... | A22C 11/0218 452/35 |
| 5,013,279 A * | 5/1991 | Southworth | ........... | A22C 11/02 426/513 |
| 5,071,326 A * | 12/1991 | Wright | .................. | F04B 7/0026 417/517 |
| 7,063,610 B2 * | 6/2006 | Mysker | ................ | A22C 11/005 452/30 |
| 7,377,841 B2 * | 5/2008 | Bartleucci | ................ | A63H 3/02 452/30 |
| 7,404,710 B2 * | 7/2008 | Le Paih | ................. | A22C 11/00 425/133.1 |
| 7,442,117 B2 * | 10/2008 | Kruse | ................ | A22C 11/0209 452/31 |
| 7,520,801 B2 * | 4/2009 | Epstein | ................ | A22C 7/0023 452/30 |
| 7,704,130 B2 * | 4/2010 | Hanten | .............. | A22C 11/0263 452/32 |

* cited by examiner

*Primary Examiner* — Richard T Price, Jr.
(74) *Attorney, Agent, or Firm* — Lawrence B. Goodwin, PLLC

(57) ABSTRACT

A one-piece adaptor that fits directly onto the output end of a nozzle of a sausage stuffer, to quickly, inexpensively and easily facilitate the application of natural casings onto the stuffer nozzle without the use of any additional, complicated, specialized equipment.

11 Claims, 2 Drawing Sheets

ADAPTOR FOR FACILITATING THE MANUFACTURE OF SAUSAGE

The present invention is directed to an adaptor for facilitating the manufacture of sausage.

BACKGROUND OF THE INVENTION

The manufacture of sausage on a small scale typically requires the use of a sausage stuffing machine into which sausage material (typically ground meat and seasoning mixture) is inserted and compressed by use of a hand crank (or an electric motor for more automated applications). The sausage material is extruded through a stuffing tube or nozzle, and into a sausage casing which is inserted over the nozzle. Natural sausage casings typically are made of beef, sheep, goat or pig intestines. Such casings are thin membranes, are fragile and must be handled carefully to avoid rips, tears or punctures in the membrane. This is particularly difficult to do, as the nozzles onto which the casings must be placed are generally cylindrically shaped at their output ends, and the casings and nozzles must be relatively close in size.

Complex apparatuses and methods have been developed to overcome the difficulties inherent in handling the casings and applying them to the nozzles. For example, U.S. Pat. No. 4,363,819 discloses a complex technique involving the application of casings to a synthetic resin sleeve, the fitting of the sleeve over the nozzle, and the subsequent removal of the sleeve facilitated by perforations therein. Similarly, U.S. Pat. No. 3,122,779 discloses a complex technique for first forming a casing support on a shell, loading a casing onto the support, removing the support, and then applying the support to a stuffer nozzle. Such techniques are complicated, cumbersome and require the use of specialized equipment, in addition to the sausage stuffing machinery.

SUMMARY OF THE INVENTION

It is therefore an object of the present invention to overcome the shortcomings of the prior art through the use of a simple, one-piece adaptor that fits directly onto the output end of stuffer nozzle, to quickly, inexpensively and easily facilitate the insertion of natural casings onto the stuffer nozzle without the use of any additional, complicated, specialized equipment.

In accordance with a first embodiment of the invention, a method to facilitate the manufacture of sausage comprises the steps of providing a sausage stuffer having a generally cylindrical nozzle through which ground meat mixture is extruded, applying an adaptor, having a tapered end portion, directly to an output end of the nozzle, applying a casing, over the tapered end portion of the adaptor, and onto the nozzle, and removing the adaptor from said nozzle, to commence the production of sausages. The step of applying the adaptor can include the step of applying an adaptor having a generally conical end. The method can include the step of applying an adaptor that fits either directly within the interior diameter of said nozzle or directly around the exterior diameter of said nozzle. The adaptor can be manually removed from the nozzle prior to extruding sausage therethrough, or the adaptor can be removed from the nozzle through the force of sausage as it is extruded from said nozzle.

In accordance with a second embodiment of the invention, an adaptor for facilitating the manufacture of sausage using a sausage stuffer having a generally cylindrical nozzle through which ground meat mixture is extruded, comprises a tapered end portion, and a collar adapted to be directly applied to an output end of the nozzle, wherein the tapered end portion is adapted to facilitate the application of a casing over the tapered end portion and onto the nozzle. The tapered end portion can have a generally conical shape. The collar can be adapted to fit either directly within the interior diameter of said nozzle or directly around the exterior diameter of said nozzle.

These and other objects of the invention will be described in detail below, with reference to the following drawing figures.

DETAILED DESCRIPTION OF THE INVENTION

Figure 1B:
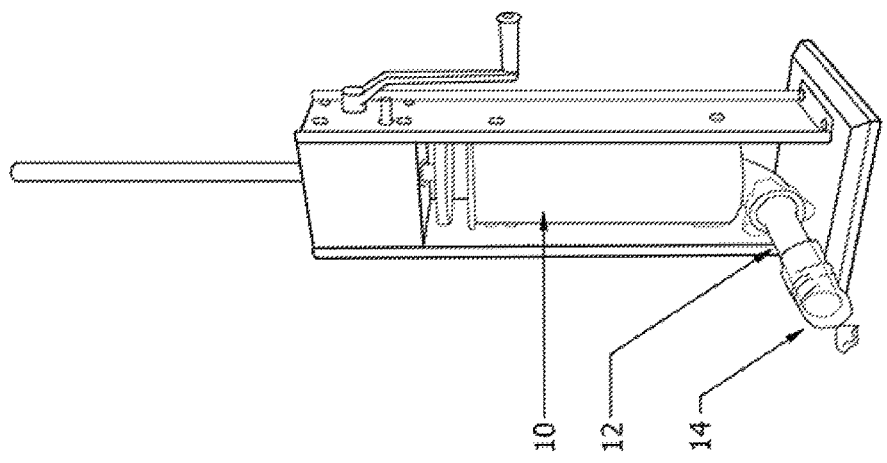
FIGS. 1A-1B are illustrations of a prior art sausage stuffer and the application of a casing to the nozzle of the stuffer.
Figure 1A:
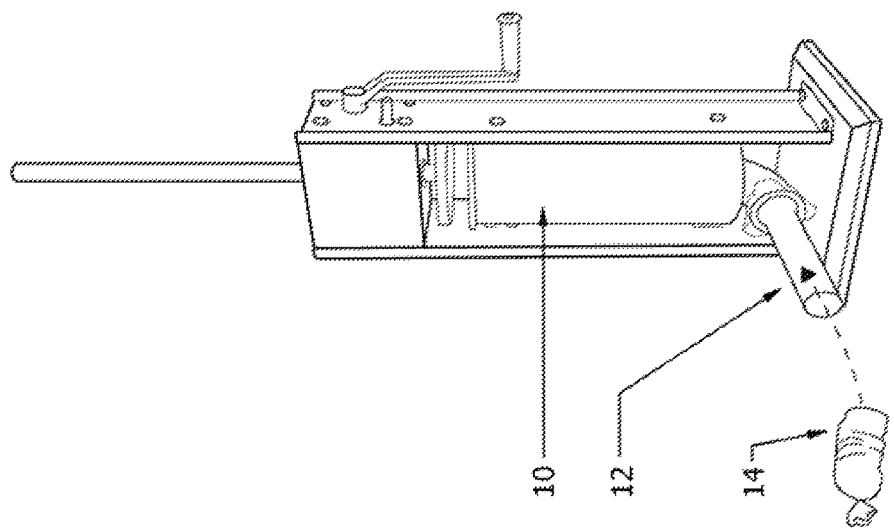

With reference to FIGS. 1A and 1B, a prior art sausage stuffer 10 is provided with a generally cylindrical nozzle 12 onto which a sausage casing 14 is applied, as shown in FIG. 1B. The nozzle 12 is usually releasably mounted on the stuffer 10, such that nozzles of different diameters can be selected, the diameter of the nozzle preferably being slightly smaller than the diameter of the casing. Because of the cylindrical shape of the nozzle, and the relatively close dimensions of the nozzle and casing, the application of the fragile casing to the nozzle is cumbersome, time-consuming, and can result in damage to the casing.

Figure 2:
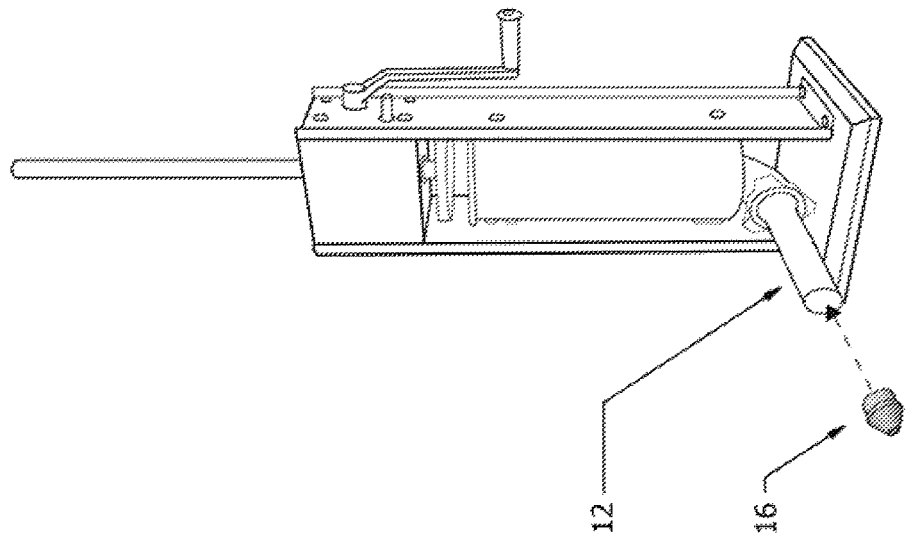
FIG. 2 is an illustration of the application of the adaptor to a sausage stuffer, in accordance with the present invention.
Figure 4:
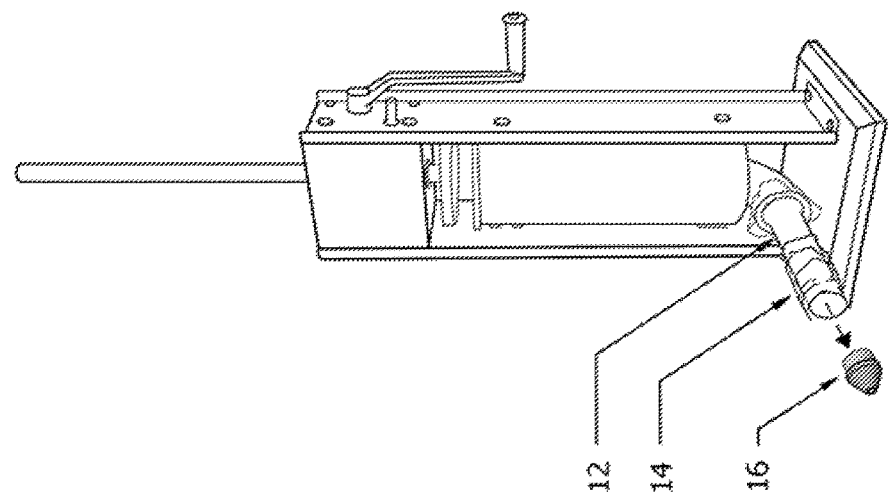
FIG. 4 is an illustration of the casing on the nozzle of the stuffer, in accordance with the present invention.
Figure 3:
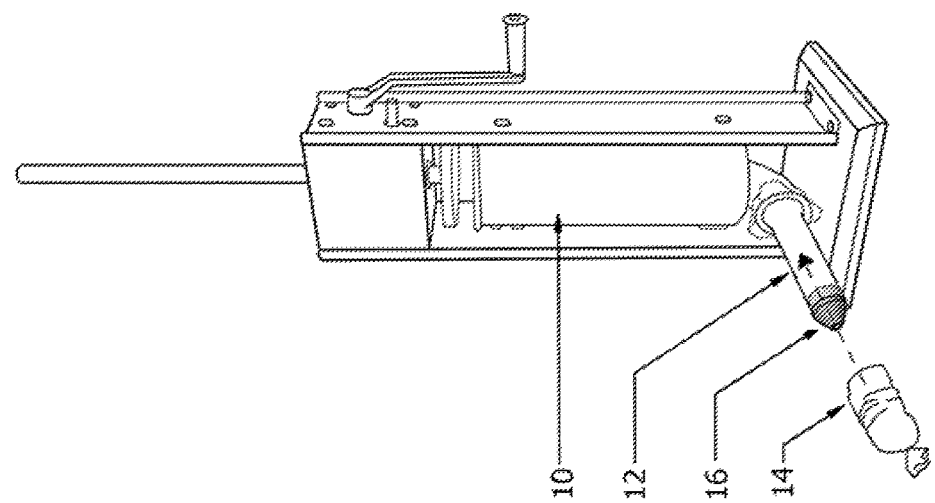
FIG. 3 is an illustration of the application of a casing to the nozzle of the stuffer, in accordance with the present invention.

FIGS. 2-4 illustrate the use of a simple, inexpensive and easy to use adaptor for facilitating the application of the casing directly onto the nozzle, without having to use complicated prior art apparatus, such as described, above. Specifically, an adaptor 16, having a generally conical or tapered end, is applied directly to the end of nozzle 12, as shown in FIG. 2. The adaptor 16 can fit either onto the exterior, or into the interior, of the nozzle 12. After the adaptor 16 is applied to the nozzle, the casing 14 can be applied to the nozzle, as shown in FIGS. 3 and 4. It will be appreciated that the adaptor 16 substantially facilitates the application of the casing directly onto the nozzle.

After the casing 14 is fully on the nozzle, the adaptor 16 can manually be removed from the nozzle prior to extruding sausage material therethrough, and preparation of the sausages can begin. Alternatively, if desired, the adaptor can be removed through the force of the sausage material as it is first extruded from said nozzle as the production of the sausages begins.

Figure 5A:
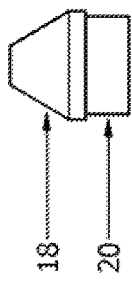
FIGS. 5A-5C illustrate side, top and perspective views, respectively, of the adaptor in accordance with the present invention.
Figure 5B:
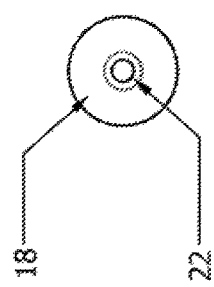
Figure 5C:
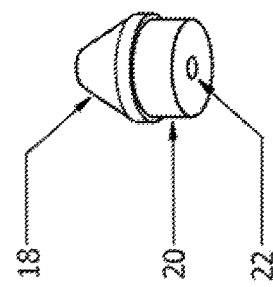

Details of the adaptor will be described with reference to FIGS. 5A-5C. As best shown in FIG. 5A, the adaptor has a generally tapered or conical section 18, and a generally cylindrical collar 20 which is adapted to fit within or over the nozzle 12. In the event the collar is adapted to fit over the nozzle, it will need to have an internal bore within the collar that is larger than that shown in FIG. 5C, to accommodate the nozzle. In the event the nozzle 12 is tapered, the internal and/or external dimensions of the collar 20 can also be tapered to accommodate the tapered nozzle, if desired. The adaptor can be made of plastic, steel or stainless steel, and preferably should be made of the same material as the nozzle. It is anticipated that a variety of adaptors will be provided to accommodate a corresponding variety of nozzles of different dimensions. Finally, a central bore 22 can be provided to allow the release of air from the nozzle, in the event the adaptor is removed through the force of the sausage material as it is extruded from said nozzle.

The foregoing preferred embodiments described herein are set forth as exemplary, and it will be appreciated that various modifications may be made without departing from the scope and spirit of the invention which is defined by the following claims.

I claim:

1. A method to facilitate the manufacture of sausage, comprising the steps of:
   a. providing a sausage stuffer having a generally cylindrical nozzle through which ground sausage material is extruded,
   b. applying an adaptor, having a tapered end portion, directly to an output end of said nozzle,
   c. applying a sausage casing, over said tapered end portion of said adaptor, directly onto said nozzle; and
   d. removing said adaptor from said nozzle, to commence the production of sausages.

2. The method of claim 1, wherein said step of applying said adaptor comprises applying an adaptor having a generally conical end.

3. The method of claim 2, wherein said step of applying said adaptor comprises applying an adaptor that fits within the interior diameter of said nozzle.

4. The method of claim 2, wherein said step of applying said adaptor comprises applying an adaptor that fits around the exterior diameter of said nozzle.

5. The method of claim 1, wherein said adaptor is manually removed from said nozzle prior to extruding sausage material therethrough.

6. The method of claim 1, wherein said adaptor is removed from said nozzle through the force of sausage material as it is extruded from said nozzle.

7. An adaptor for facilitating the manufacture of sausage using a sausage stuffer having a generally cylindrical nozzle through which ground sausage material is extruded, comprising:
   a. a tapered end portion, and
   b. a collar adapted to be applied directly to an output end of said nozzle,
   wherein said tapered end portion is adapted to facilitate the application of a casing over said tapered end portion directly onto said nozzle, and wherein said adaptor is adapted to be removed from said nozzle through the force of said sausage material as it is extruded from said nozzle as the production of sausage begins.

8. The adaptor of claim 7, wherein said tapered end portion has a generally conical shape.

9. The adaptor of claim 8, wherein said collar is adapted to fit within the interior diameter of said nozzle.

10. The adaptor of claim 8, wherein said collar is adapted to fit around the exterior diameter of said nozzle.

11. The adaptor of claim 8 wherein said adaptor has a through-bore to allow the release of air from said nozzle.

* * * * *